March 28, 1961 JEAN-PIERRE CAUSSE ET AL 2,977,252
PHOTOSURFACE AND METHOD OF MAKING SAME
Filed July 20, 1956 2 Sheets-Sheet 1

INVENTORS.
JEAN-PIERRE CAUSSE.
ANDRÉ LALLEMAND.
BY

THEIR ATTORNEY.

March 28, 1961   JEAN-PIERRE CAUSSE ET AL   2,977,252
PHOTOSURFACE AND METHOD OF MAKING SAME
Filed July 20, 1956   2 Sheets-Sheet 2

INVENTORS.
JEAN-PIERRE CAUSSE
ANDRÉ LALLEMAND
BY William P. Sherman
THEIR ATTORNEY

United States Patent Office 2,977,252
Patented Mar. 28, 1961

2,977,252

PHOTOSURFACE AND METHOD OF MAKING SAME

Jean-Pierre Causse, Ridgefield, Conn., and André Lallemand, Paris, France, assignors, by mesne assignments, to Schlumberger Well Surveying Corporation, Houston, Tex., a corporation of Texas Filed July 20, 1956, Ser. No. 599,207

Claims priority, application France Dec. 21, 1955

11 Claims. (Cl. 117—211)

This invention relates to photosurfaces and more particularly to photosurfaces such as semitransparent photocathodes, and methods of preparing the same.

Surfaces which, when exposed to radiation, emit electrons are commonly known as photosurfaces, or as photocathodes when operated at a negative potential with respect to an electron collecting electrode. Photocathodes are of particular utility in photomultipliers for converting incident radiation, such as that derived from scintillation crystals, into electrical signals. In one application, for example, a photomultiplier together with scintillation crystals may be lowered into a borehole to detect natural or artificially induced radiations.

Many photocathodes heretofore produced, especially when designed for photomultipliers, have been of the semitransparent type wherein the incidence of radiation and the collection of electrons occur on opposite sides of the photocathode. Semitransparency has been obtained by applying a photosensitive layer of cesium-antimony, for example, directly on the window portion of a soda-lime glass envelope.

Because soda-lime glass is relatively fragile, the use of hard borosilicate glass would be desirable where severe conditions are encountered, as in radioactivity well logging. However, the boric oxide contained in this glass has been found to deteriorate photosensitive materials by reacting with alkali or alkaline earth metals therein.

Accordingly, an object of this invention is to provide a new and improved photosurface on a hard glass window, together with a method of preparing the same, which overcomes this disadvantageous deterioration.

Another object of the invention is to provide a photosurface stable in its sensitivity despite temperature changes and lapse of time.

Another object of this invention is to provide a photosurface of high structural strength providing a stable high value of sensitivity.

Yet another object of this invention is to provide a semitransparent conductive photocathode of a composition stable with lapse of time and exposure to relatively high temperatures.

Still another object is to provide a method for preparing a photosurface attaining the foregoing objects in a manner permitting close quality control.

These and other objects of the invention are attained, in accordance with this invention, by applying a film of refractory metal of controlled thickness to a hard borosilicate glass window to provide a barrier layer intermediate the window and an alkali-containing photosensitive layer. The semitransparent photosurface thus comprises a glass window containing boric oxide, a semitransparent layer of refractory metal and an alkali-containing photosensitive layer, the refractory metal layer preventing reaction between the alkali and the boric oxide of the window.

In preparing this photosurface, the refractory metal is evaporated from a filament heated to such a temperature that the filament itself serves as a light source. Deposition of the refractory metal is then controlled in accordance with the transmission of light from the filament through the photosurface under preparation.

The invention together with others of its objects and advantages will be more perfectly understood from the following detailed description, taken in conjunction with the drawings, in which:

Fig. 3b is a graphical representation of the time variation of light transmitted from the filament through the photosurface, corresponding to the time variations in filament current depicted in Fig. 3a.

Figure 1:
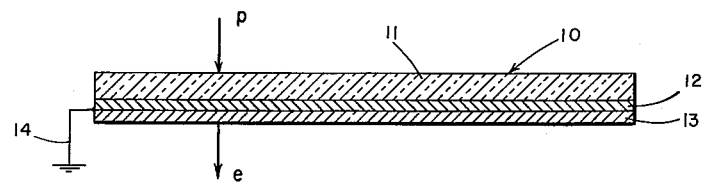
Fig. 1 is a sectional view of a photosurface prepared in accordance with this invention.

Throughout the figures like reference numerals are employed to designate similar elements. In Fig. 1 is shown a photosurface 10 comprising a window 11, a semitransparent barrier film 12, and a photosensitive layer 13. A conductor 14, which may be grounded, is electrically connected to the film 12. For transparency the window 11 may be composed of glass and comprise a limited area of a glass envelope such as is commonly employed to enclose the portions of a phototube maintained under vacuum. For applications where the photosurface, or the entire phototube of which it may be a part, is subjected to mechanical or thermal stresses, soda-lime-silicate glasses commonly used for vacuum tube envelopes are found to lack adequate durability. In radioactivity well logging using scintillation crystals, for example, photomultiplier tubes are employed that must withstand severe mechanical shocks in handling and in transit and also must be capable of passing from relatively low temperatures at the surface to very high temperatures encountered in deep wells.

To achieve the desired versatility, the window 11 is composed of hard borosilicate glass such as Pyrex, a product of Corning Glass Works having the approximate composition of 80.5% silica, 13% boric oxide, 4% soda, 0.5% potash and 2% alumina. This glass is chemically durable and has a low coefficient of thermal expansion and high strength. It is, moreover, susceptible to molding or forming as windows, envelopes and the like.

The photosensitive layer 13 is preferably composed either of cesium-antimony, potassium-antimony, sodium-antimony, potassium-sodium-antimony, or potassium-sodium-cesium-antimony but may be composed of any alkali or alkaline earth metal including particularly sodium, potassium, rubidium, cesium, lithium and barium, or any combination of such metals, forming an intermetallic compound with antimony, bismuth, thallium, lead, sulfur, selenium or tellurium, or combined with oxygen to form an oxide. The preferred intermetallic compounds, listed above, are characterized by a high photoelectric sensitivity and are distinguished in varying degrees by a minimum production of "dark current" due to a high work function. The compounds or alloys of which the photosensitive layer 13 may be composed, in addition to containing an alkali or alkaline earth metal, characteristically have a relatively high resistivity.

It has been found that when a photosensitve layer composed of cesium-antimony, for example, is applied directly to a borosilicate glass window, a slow reaction occurs between the alkali metal cesium and the boric oxide of the glass. A sensitivity substantially below that achievable with a soda-lime glass window results. Moreover, this reaction appears to progress with time so that a photosurface thus prepared cannot be expected to retain its initial properties. Since a cesium-antimony layer exhibits the properties of a semiconductor, furthermore, drawing a relatively large instantaneous current from a limited area of the photosensitive layer causes appreciable potential differences across the surface and consequent spurious variations in sensitivity. Such variations in sensitivity across the area of the photosurface are partciularly disadvantageous in the use of photosurfaces in scintillation detectors for gamma ray spectroscopy where a linear response is necessary to accuracy.

These difficulties encountered when an alkali photosensitive surface is applied directly to a borosilicate glass are overcome, in accordance with the principles of this invention, by interposing between the photosensitive layer and the glass window a film of metal chemically inert both to the photosensitive layer and the glass and molecularly continuous to prevent diffusion of the reactive constituents of the photosensitive layer and the glass window. Such film 12, shown in Fig. 1, may be composed of any of the high melting point metals, or alloys thereof, which are thus chemically inert. While pure tungsten is the preferred composition of the metallic layer 12, such metals as chromium, iridium, molybdenum, palladium, platinum and tantalum are likewise suitable. In view of their characteristics of chemical inertness and high melting point, these metals are herein referred to as refractory metals. The melting point of each is above 1500° C. and each is substantially non-reactive with the constituents of borosilicate glasses and alkali and alkaline earth metallic photosensitive layers.

Since for many important applications of photosurfaces, semitransparency is an important quality, the metallic layer 12 is of a thickness to transmit appreciable proportions of incident light. For example, with a tungsten composition, the thickness of the film 12 may be on the order of a few millimicrons thick whereby its absorption of incident light is on the order of 10%.

Tungsten is the preferred composition of the metallic layer 12 because, of the refractory metals above listed, it yields the highest conductivity for the percentage of light absorbed. Hence, an extremely thin film may provide an appreciable conductivity, sufficient to render substantially uniform the sensitivity of the photosensitive layer 13 even while high currents are drawn from relatively limited areas thereof. Moreover, the tungsten appears to contribute to the photoresponse of the surface 10 especially when the layer 13 includes cesium. Thus, while the film 12 of tungsten may absorb 10% of incident light, the sensitivity of the photosurface 10 has been found to be the same as, or higher than, that of a photosurface formed of cesium-antimony on soda-lime glass. The sensitivity of the photosurface 13 is also found to be substantially double that obtained when the cesium-antimony layer is applied directly to borosilicate glass.

In operation, radiation quanta represented by photon $p$ are incident upon the outer surface of the window 11, pass through the window and generally through the metallic layer 12 to eject photoelectrons, represented in Fig. 1 by electron $e$, from the inwardly facing surface of the photosensitive layer 13.

As the emission of photoelectrons will tend to leave the photosensitive layer 13 charged electrically positive, electrons are supplied through the conductor 14 to the conductive layer 12, thence to the photosensitive layer 13.

Figure 4:
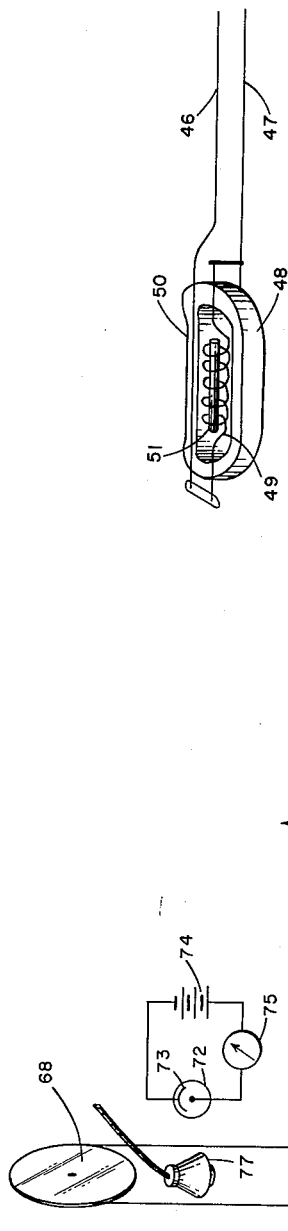
Fig. 4 is an enlarged view of an evaporator shown in Fig. 2, for depositing photosensitive metals.
Figure 2:
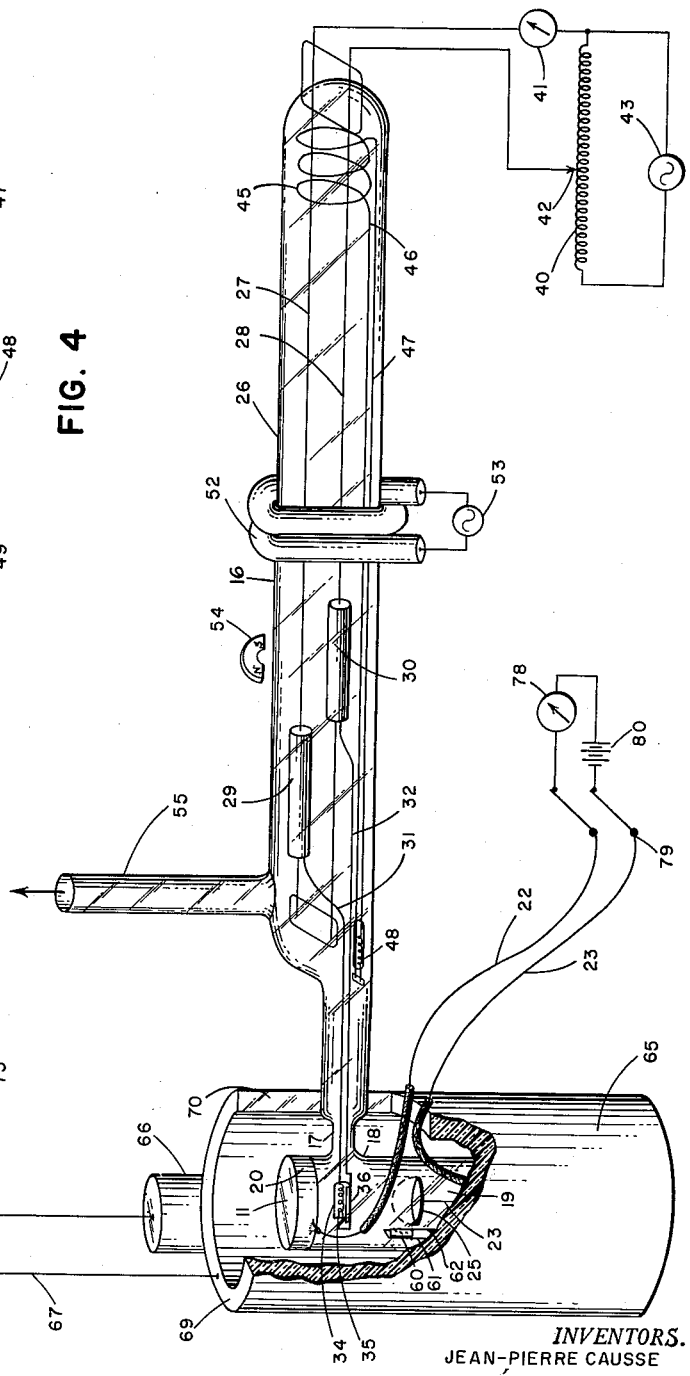
Fig. 2 is a schematic view in elevation of apparatus for practicing the method of this invention.

The photosurface 10 requires extremely careful preparation if consistent high sensitivities are to be obtained. One method of preparing the surface utilizes apparatus as shown in Figs. 2 and 4. This apparatus comprises a glass side tube 16 having a throat portion 17 connected integrally with the sidewall 18 of a photomultiplier 19 being processed. The entire envelope of the photomultiplier 19, including the sidewalls 18 and flat end window 11, is composed of a hard borosilicate glass, and the side tube 16 may be of similar composition. Preliminary to the process of this invention, a band 20 of silver may be deposited on the inner surface of walls 18 in electrical connection with a lead-in wire 22. With the silver band 20 contiguous to the inner surface of the window 11, electrical contact may be made with the refractory metal layer to be deposited thereon. Conductor 23 passes through the pinch (not shown) of the photomultiplier to connect with the first dynode 25 of the photomultiplier. Dynode 25 may then serve, for purposes of processing, as an anode. Except for the throat portion 17, the photomultiplier 19 is sealed off to sustain a vacuum.

Within an enlarged, elongated end portion 26 of the side tube 16 are a pair of conductive rails 27, 28 rigidly supported in spaced, parallel relation. These rails 27, 28, which are of low conductivity to carry heating currents, support cylindrical shoes 29, 30 for making sliding electrical contact between the rails and rigid conductors 31, 32, respectively. The conductors 31, 32 support a tungsten evaporator 34 comprising a tungsten filament 35 in series with the conductors 31, 32 and a dished reflector 36 composed of nickel or platinum. In use, the reflector is positioned to expose the filament 35 only to the inner surface of window 11. The heating of the evaporator 34, which is sized to pass through the throat portion 17, is accomplished through connection of rail 27 with a terminal of an autotransformer 40 serially through an ammeter 41 and connection of rail 28 with a variable tap 42 of the autotransformer, the autotransformer being in turn energized from a suitable A.-C. source 43.

Within the same elongated portion 26, a helix 45 composed, for example, of nickel wire is fitted about the rails 27, 28 and connects with one end of conductors 46, 47 supporting a second evaporator 48, at their other ends. This second evaropator 48, shown in detail in Figure 4, comprises a tungsten filament 49 serially connected with conductors 46, 47 and a boat or reflector 50 composed, for example, of glass, in which the filament is recessed. A slug 51 of photosensitive metal, such as antimony, is disposed within the filament. The assemblage of evaporator 48, conductors 46, 47 and helix 45 is movable longitudinally of the side tube 16 to introduce the evaporator 48 through the throat portion 17 into the photomultiplier 19 when the refractory metal evaporator 34 is withdrawn. About the enlarged portion 26 is a high frequency heating coil 52 connected with an adjustable supply 53 of A.-C. current. This high frequency coil 52 is disposed for effective inductive coupling with the helix 45, thereby to supply heating current to the tungsten filament 49. A magnet 54 may be used for manipulating the evaporators.

For the purpose of introducing a metal such as cesium into the photomultiplier 19 when it has been evacuated by a pump (not shown) connected to tubulation 55, a flat channel 60 composed, for example, of tantalum is supported on leads 61 and 62 within the photomultiplier 19. The channel 60 contains, for example, an intimate mixture of cesium chromate with a reducing agent such as powdered silicon. The leads 61 and 62 may be suitably arranged for connection to a current source (not shown) when it is desired to flash the cesium on the photosurface 11.

An oven 65, which is counterbalanced by a weight 66 suspended by a wire 67 running over a pulley 68, is provided with an open end 69 having a slot 70 relieved therefrom. In the raised position of the oven, the slot 70 receives the side tube 16 and conductors 22, 23 while the oven encircles the photomultiplier 19 to apply heat to the walls 18 thereof.

Opposite the open end 69 is a phototube 72 having its photocathode 73 disposed to receive light transmitted upwardly from the filament 35 through the window 11. To measure the amount of light incident upon the photocathode 73, a light responsive means such as a conventional circut comprising a battery 74 and a meter 75 is connected in series with the phototube 72.

Adjacent the phototube 72 is a standard light source 77 disposed to cast a beam upon the window 11 to test its photosensitivity during processing. The determination of photosensitivity is facilitated by connection of conductors 22, 23 to an electronic galvanometer 78 through a switch 79. In the closed position of the switch 79, the conductors 22, 23 connect the photocathode 11 and dynode 25 in series with a D.-C. potential supply 80 and the galvanometer 78. Switch 79 across conductors 22 and 23 may be opened as a protection to the galvanometer while flashing tungsten.

Figure 3A:
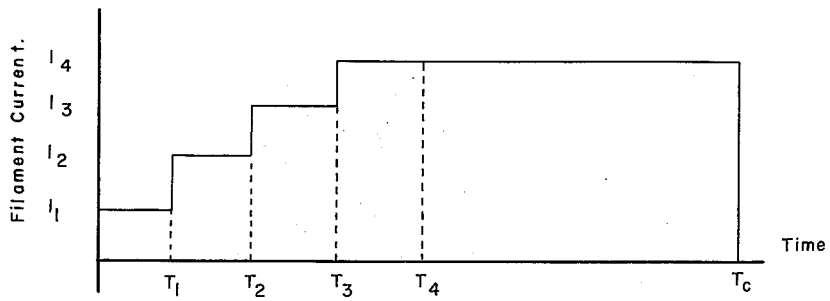
Fig. 3a is a graphical representation of the time variation of current passed through the evaporating filament.
Figure 3B:
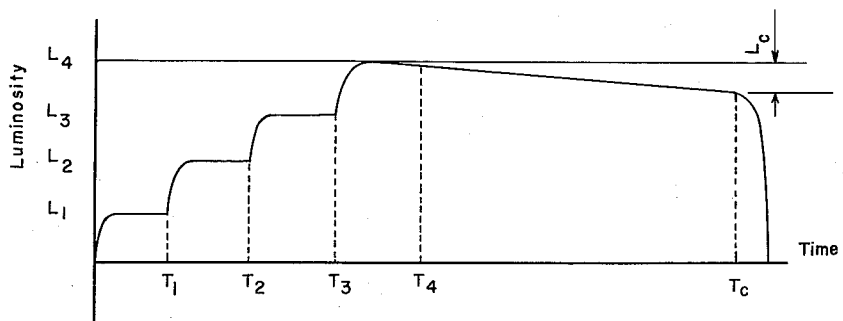

In practicing the process of this invention utilizing the apparatus of Figs. 2 and 4, a vacuum is first drawn through tubulation 55 while heat is applied to the apparatus for out gassing. While the system remains evacuated, and after the window 11 has cooled, the evaporator 34 for the refractory metal is introduced into the photomultiplier and a small heating current $I_1$ (Fig. 3a) as shown on meter 41 is applied for a period of time $T_1$. With the light source 77 extinguished, a small amount of light $L_1$ (Fig. 3b) is transmitted from the filament 35 through the window 11 as measured by the meter 75. Depending upon the calorific inertia of the filament 35, the time delay before the luminosity reaches a steady value $L_1$ after application of filament current $I_1$ may be relatively short compared to the time $T_1$. The absence of a decay in the steady state value $L_1$ is indicative of the absence of evaporation or sublimation of the refractory metal carried by the evaporator 34.

Accordingly, the heating current is increased by successive steps $I_2$, $I_3$, $I_4$ for successive time intervals $T_2$, $T_3$ and $T_4$. At the time $T_4$ the luminosity measured by meter 75 no longer retains a steady value but has dropped from a maximum intensity $L_m$ to a lower value. This indicates that refractory metal is being deposited on the window 11 in increasing quantities, thereby progressively diminishing the quantity of light transmitted by the window 11. The filament heating current is maintained at the steady value of $I_4$ in order that the amount of light emanating from the filament may remain constant. After a predetermined diminution in the amount of light transmitted while the filament is carrying the current $I_4$, this diminution being indicated in Fig. 3b as a critical amount $L_c$, the critical time for terminating evaporation of the refractory metal is reached, indicated by time $T_c$.

Since the filament 35 itself is used as the light source and is directly opposite the window 11 on its interior side, the measurement of light transmission through the window 11 may be extremely accurate and free of any spurious effects due to changes in reflections or refractions of the measuring light.

Having applied the tungsten film 12 to the inner surface of the glass window 11, the evaporator 34 is withdrawn from the photomultiplier 19 by moving the magnet 54 in proximity to shoes 29, 30 outwardly along the enlarged portion 26 of the side tube 16. The window 11 is allowed to cool, while the oven 65 is brought up into a position surrounding the lower portions of the photomultiplier 19. If desired, the cooling of the window 11 may be speeded by blowing cold air thereagainst, the cooling being desired to localize condensation of cesium and antimony on the window 11.

The evaporator 48 is advanced through the side tube 16 into the photomultiplier 19 by moving the magnet 64 in proximity to the nickel helix 45. The side tube will be seen to afford adequate clearance for the evaporator 48 to be inserted when the evaporator 34 has been withdrawn. Having moved the evaporator 48 into the phototube 19 with the oven 65 in operation, high frequency power is applied to the coil 52 by source 53 to cause a heating current to flow through helix 45 of sufficient amount to evaporate the slug 51 of antimony from the tungsten filament 49. Cooling the window 11 while heating the side walls 18 tends to restrict the deposition of antimony to the tungsten film. Evaporation of antimony is continued until the light transmission of the deposited film is again reduced a desired amount, whereupon the evaporator 48 is withdrawn, and any excess antimony on the filament which may be liberated passes through tubulation 55.

Power is then applied to the channel 60 through leads 61, 62 sufficient gradually to liberate and flash some of the cesium in the channel onto the antimony film. The standard light source 77 is then energized to illuminate the window 11 thereby to eject photoelectrons from the formative cesium-antimony surface, in accordance with its sensitivity. By noting the reading of the meter 75, the flashing of the cesium may be terminated when the photosensitivity reaches substantially a maximum value.

If desired, the photomultiplier may then be alternately subjected to brief flashing of cesium followed by oven baking until the photosensitivity ceases to rise further. Thereupon, the oven is operated to slowly increase the temperature at the window 11 to a value not exceeding 150° C., to promote an intimate diffusion and interaction of the antimony and cesium and to drive off cesium in excess of that required to form a stable composition.

As experience will tend to show at what filament current evaporation of a refractory metal will take place, the filament current may be raised gradually to this known value, rather than periodically stepped up to the value, and then held at this current value until the diminution in light transmission indicated a sufficient deposition of the metal.

It is not intended that this invention be considered as limited to a cesium-antimony layer, and therefore the steps above-described for producing this layer are to be considered as merely exemplary. Thus, a cesium-antimony layer or a layer of other composition might be formed in a variety of well known ways. It will be apparent that both manual and automatic means can be employed for increasing the filament current for the refractory metal evaporator and for terminating this current when a given light transmission value is reached. Where a relatively low filament current is employed which does not result in visible light, a photo tube or photocell sensitive to infra-red light may be employed.

The apparatus and method employed for producing the photosurface of this invention are characterized by high degrees of flexibility and accuracy of control. Experience has shown that photosurfaces can be produced stable as to both thermal and mechanical shocks and affording a relatively uniform high degree of photosensitivity in a temperature range extending at least from 20° C. to 150° C. Where sensitivity to ultra-violet radiation is desired, the window 11 may be composed of Corex D, a silica-free glass produced by the Corning Glass Works and containing appreciable amounts of boric oxide.

The embodiment of the invention herein shown and described is intended to exemplify the principles of the invention and various other modifications and embodiments will occur to those skilled in the art. Accordingly, such embodiments and modifications as lie within the true scope and spirit of this invention are intended to be embraced within the ambit of the appended claims.

We claim:

1. In a method of preparing a semitransparent photosurface on a transparent window, the steps comprising passing current through a pure tungsten filament opposite said window in a vacuum to evaporate the tungsten of said filament onto said window, photoelectrically detecting the decrease in radiation transmitted from said filament through said window as a uniform film of said pure tungsten is condensed on said window, terminating the evaporation of said pure tungsten at a time when the detected decrease in the transmitted radiation is a predetermined fraction on the order of 10% of the maximum detected radiation, and while maintaining the vacuum volatilizing successive metals opposite said window to evaporate a photosensitive intermetallic compound onto the uniform tungsten film out of reactive contact with said window.

2. In a method of preparing a semitransparent photosurface on a transparent window, the steps comprising passing current through a pure tungsten filament opposite said window in a vacuum to heat said filament to incandescence of constant luminous intensity and to evaporate the tungsten of said filament onto said window, photoelectrically detecting the decrease in radiation transmitted from said filament through said window as a uniform film of said pure tungsten is condensed on said window, interrupting said current at a time when the detected decrease in the transmitted radiation is a predetermined refraction on the order of 10% of the maximum detected radiation, and while maintaining the vacuum volatilizing successive metals opposite said window to evaporate a photosensitive intermetallic compound onto the uniform tungsten film out of reactive contact with said window.

3. In a method of preparing a semitransparent photosurface on a transparent window, the steps comprising passing a constant heating current through a tungsten filament in a vacuum to maintain said filament at a constant incandescent temperature sufficiently high to evaporate the tungsten of said filament, condensing vapors of said tungsten on a transparent window disposed opposite said filament to form a uniform tungsten film directly on said window, photoelectrically detecting the decrease in radiation transmitted from said filament through said window as a film of said tungsten is condensed on said window, terminting the evaporation of said tungsten at a time when the detected decrease in the transmitted radiation is a predetermined fraction on the order of 10% of the maximum detected radiation, and while maintaining the vacuum volatilizing successive metals opposite said window to evaporate a photosensitive intermetallic compound onto the uniform tungsten film out of reactive contact with said window.

4. In a method of preparing a semitransparent photosurface on a transparent window, the steps comprising passing a constant heating current through a tungsten filament to maintain said filament at a constant incandescent temperature sufficiently high to evaporate the tungsten of said filament, condensing vapors of said tungsten on a transparent window disposed opposite said filament to form a uniform tungsten film directly on said window, photoelectrically detecting the decrease in radiation transmitted from said filament through said window as a film of said tungsten is condensed on said window, terminating the evaporation of said tungsten at a time when the detected decrease in the transmitted radiation is a predetermined fraction on the order of 10% of the maximum detected radiation, selectively cooling said window while maintaining a vacuum adjacent the freshly deposited tungsten film, and sequentially evaporating successive metallic photosensitive materials on said tungsten film in said vacuum to form a photosensitive intermetallic layer out of direct contact with said closed window.

5. In a method of preparing a semitransparent photosurface on a window, the steps comprising passing through a tungsten filament disposed in a vacuum opposite a window an electric current sufficient to raise the filament to incandescence without evaporation of the tungsten of said filament, increasing the heating current in steps through successively higher values including a value sufficient to evaporate said tungsten onto said window, the current at each successive value being maintained constant for a time interval longer than the time required for said filament to reach a steady temperature corresponding with constant current of such value, detecting the radiation transmitted from said filament directly through said window during each time interval as said heating current approaches a value sufficient to evaporate said tungsten, measuring the maximum amount of radiation so detected during the first time interval when a decrease in radiation with continued heating is detected, and terminating the heating current of constant value applied during said first time interval when the amount of radiation detected decreases by a predetermined fraction on the order of 10% of said maximum amount.

6. In a method of preparing a semitransparent photosurface on a glass window, the steps of passing current through a tungsten filament opposite said window to heat said filament to incandescence and to evaporate the tungsten of said filament in a vacuum onto said window to form a uniform semitransparent film of said tungsten, and while maintaining said vacuum volatilizing successive metals which are to provide a photosensitive intermetallic compound and cooling said window simultaneously as said successive metals are being volatilized to condense said successive metals on said film out of reactive contact with said window, then heating said window to promote an intimate diffusion and interaction between said condensed successive metals to stabilize said photosensitive intermetallic compound.

7. A semitransparent photosurface comprising a glass window, a molecularly continuous semitransparent barrier film having solely a refractory metal composition directly on said window and having a thickness on the order of a few millimicrons, said refractory metal having a melting point in excess of 1500° C. and being chemically inert to boric oxide, alkali metals and alkaline earth metals, and a photosensitive layer on said film and spaced thereby from said window, said photosensitive layer being composed of at least one metal in the group consisting of alkali and alkaline earth metals, said glass window having a composition which interacts upon contact with said one metal to impair the photosensitivity of said photosensitive layer.

8. A semitransparent photocathode comprising a hard borosilicate glass window, a molecularly continuous semitransparent film of pure tungsten directly on said window and having a thickness on the order of a few millimicrons, and a photosensitive layer on said film and spaced thereby from said window, said photosensitive layer being composed of at least one metal in the group consisting of alkali and alkaline earth metals, said glass window having a composition which is reactive upon contact with said one metal to impair the photosensitivity of said layer.

9. The method of preparing a photocathode on the clean window of a photomultiplier having an in'tially open vacuum-pumped side tube containing movable evaporators for a substrate metal and photo-emissive material, comprising the steps of advancing the substrate metal evaporator from said side tube into said evacuated photomultiplier, supplying stepwise increased values of heating current to said substrate metal evaporator to evaporate a metallic film directly on said window, detecting the decreased transmission of light through said window and terminating said heating current when the light has decreased on the order of ten percent from its maximum value, withdrawing said substrate metal evaporator and advancing a photosensitive material evaporator into said evacuated photomultiplier, inductively coupling heating current to said photosensitive material evaporator to cause evaporation of photosensitive material on said metallic film out of contact with said window, withdrawing such photosensitive material evaporator and in sequence evaporating other photosensitive material to form a composite photosensitive layer, projecting a standard illumination on the exterior of said window and detecting the response of said photomultiplier to photo-emission from said composite layer to control evaporation of photosensitive material in accordance with the maximum photosensitivity indicated, and heating said window to a temperature not exceeding 150° C. to promote an intimate diffusion and interaction of said photosensitive materials while continuing to evacuate said photomultiplier via said side tube until said layer is stabilized.

10. The method of preparing a photocathode on the clean window of a photomultiplier having an initially open vacuum-pumped side tube containing movable evaporators for a substrate metal and photo-emissive material, comprising the steps of advancing the substrate metal evaporator from said side tube into said evacuated photomultiplier, supplying stepwise increased values of heating current to said substrate metal evaporator to evaporate a metallic film directly on said window, detecting the decreased transmission of light through said window and terminating said heating current when the light has decreased on the order of ten percent from its maximum value, withdrawing said substrate metal evaporator and advancing a photosensitive material evaporator into said evacuated photomultiplier, inductively coupling heating current to said photosensitive material evaporator to cause evaporation of antimony on said metallic film out of contact with said window, withdrawing such photosensitive material evaporator and in sequence evaporating cesium to form a composite photosensitive layer, projecting a standard illumination on the exterior of said window and detecting the response of said photomultiplier to photo-emission from said composite layer to control evaporation of photosensitive material and in accordance with the maximum photosensitivity indicated, and heating said window to a temperature not exceeding 150° C. to promote an intimate diffusion and interaction of said photosensitive materials while continuing to evacuate said photomultiplier via said side tube until said layer is stabilized.

11. The method of preparing a photocathode on the clean window of a photomultiplier having an initially open vacuum-pumped side tube containing movable evaporators for a substrate metal and photo-emissive material, comprising the steps of advancing the substrate metal evaporator from said side tube into said evacuated photomultiplier, supplying stepwise increased values of heating current to said substrate metal evaporator to evaporate a metallic film directly on said window, detecting the decreased transmission of light through said window and terminating said heating current when the light has decreased on the order of ten percent from its maximum value, withdrawing said substrate metal evaporator and advancing a photosensitive material evaporator into said evacuated photomultiplier, inductively coupling heating current to said photosensitive material evaporator to cause evaporation of antimony on said metallic film out of contact with said window, withdrawing such photosensitive material evaporator and in sequence evaporating cesium to form a composite photosensitive layer, projecting a standard illumination on the exterior of said window and detecting the response of said photomultiplier to photo-emission from said composite layer to control evaporation of photosensitive material in accordance with the maximum photosensitivity indicated, and heating said photomultiplier in the course of evaporating cesium until the photosensitivity ceases to rise further.

References Cited in the file of this patent

UNITED STATES PATENTS

| | | |
|---|---|---|
| 526,147 | Edison | Sept. 18, 1894 |
| 2,003,344 | De Boer et al. | June 4, 1935 |
| 2,093,699 | Varian et al. | Sept. 21, 1937 |
| 2,239,452 | Williams et al. | Apr. 22, 1941 |
| 2,254,073 | Klatzow | Aug. 26, 1941 |
| 2,443,196 | Raines et al. | June 15, 1948 |
| 2,472,605 | McRae | June 7, 1949 |
| 2,491,199 | Mulder | Dec. 13, 1949 |
| 2,726,173 | Martin | Dec. 6, 1955 |
| 2,770,561 | Sommer | Nov. 13, 1956 |
| 2,779,888 | Stoudenheimer | Jan. 29, 1957 |

FOREIGN PATENTS

| | | |
|---|---|---|
| 665,279 | Great Britain | Jan. 23, 1952 |
| 896,407 | Germany | Nov. 12, 1953 |
| 714,054 | Great Briain | Aug. 25, 1954 |